(12) United States Patent
Shirotori et al.

(10) Patent No.: US 8,049,993 B2
(45) Date of Patent: Nov. 1, 2011

(54) MAGNETIC RECORDING MEDIUM AND MAGNETIC STORAGE DEVICE

(75) Inventors: Satoshi Shirotori, Yokohama (JP); Yoshiyuki Kamata, Tokyo (JP); Kaori Kimura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 893 days.

(21) Appl. No.: 12/076,004

(22) Filed: Mar. 12, 2008

(65) Prior Publication Data

US 2008/0285174 A1 Nov. 20, 2008

(30) Foreign Application Priority Data

May 14, 2007 (JP) ................................ P2007-128318

(51) Int. Cl.
G11B 5/82 (2006.01)
G11B 5/72 (2006.01)

(52) U.S. Cl. ........................................................ 360/135

(58) Field of Classification Search .................. 360/135; 428/834–835.8, 836
See application file for complete search history.

(56) References Cited

U.S. PATENT DOCUMENTS

| | | | |
|---|---|---|---|
| 3,627,330 A | 12/1971 | Dimitracopoulos | |
| 4,396,479 A | 8/1983 | Jones | |
| 4,599,135 A | 7/1986 | Tsunekawa et al. | |
| 4,647,494 A | 3/1987 | Meyerson et al. | |
| 4,662,985 A | 5/1987 | Yoshida et al. | |
| 4,701,374 A | 10/1987 | Sagoi et al. | |
| 4,935,278 A | 6/1990 | Krounbi et al. | |
| 5,192,697 A | 3/1993 | Leong | |
| 5,402,278 A | 3/1995 | Morita | |
| 5,497,085 A | 3/1996 | Tian et al. | |
| 5,516,031 A | 5/1996 | Nishikawa et al. | |
| 5,535,069 A | 7/1996 | Chiao et al. | |
| 5,766,718 A | 6/1998 | Matsuda et al. | |
| 5,771,131 A | 6/1998 | Pirzadeh | |
| 5,772,905 A | 6/1998 | Chou | |
| 5,943,180 A | 8/1999 | Seo et al. | |
| 5,956,216 A | 9/1999 | Chou | |
| 6,095,160 A | 8/2000 | Chu | |
| 6,104,578 A | 8/2000 | Kitazaki et al. | |
| 6,153,281 A | 11/2000 | Meyer et al. | |
| 6,168,845 B1 | 1/2001 | Fontana, Jr. et al. | |

(Continued)

FOREIGN PATENT DOCUMENTS

CN 1360304 7/2002

(Continued)

OTHER PUBLICATIONS

Office Action dated Jun. 29, 2009 in Korean Patent Application No. 10-2008-43871, and English-language translation thereof.

(Continued)

*Primary Examiner* — Will J Klimowicz
(74) *Attorney, Agent, or Firm* — Nixon & Vanderhye, P.C.

(57) ABSTRACT

A magnetic recording medium includes: a substrate; a recording layer that is formed on the substrate to have a grooved pattern; and a protection layer formed on the recording layer to fill in the grooved pattern, wherein the recording layer is defined to have a servo portion that retains servo data and a recording track portion that retains recording data, and wherein a first film thickness of the protection layer at the servo portion is larger than a second film thickness of the protection layer at the recording track portion by a thickness that is in a range from 1 nm to 10 nm.

11 Claims, 2 Drawing Sheets

U.S. PATENT DOCUMENTS

| | | |
|---|---|---|
| 6,171,676 B1 | 1/2001 | Mukai et al. |
| 6,187,413 B1 | 2/2001 | Kuo et al. |
| 6,238,582 B1 | 5/2001 | Williams et al. |
| 6,254,966 B1 | 7/2001 | Kondo |
| 6,331,364 B1 | 12/2001 | Baglin et al. |
| 6,365,012 B1 | 4/2002 | Sato et al. |
| 6,426,845 B1 | 7/2002 | Sacks et al. |
| 6,433,944 B1 | 8/2002 | Nagao et al. |
| 6,469,852 B1 | 10/2002 | Nakagawa |
| 6,564,445 B1 | 5/2003 | Hashimoto et al. |
| 6,595,506 B1 | 7/2003 | Zide et al. |
| 6,602,620 B1 | 8/2003 | Kikitsu et al. |
| 6,641,935 B1 | 11/2003 | Li et al. |
| 6,689,495 B1 | 2/2004 | Sato et al. |
| 6,751,035 B1 | 6/2004 | Belser |
| 6,753,043 B1 | 6/2004 | Kuo et al. |
| 6,753,130 B1 | 6/2004 | Liu et al. |
| 6,841,220 B2 | 1/2005 | Onoe et al. |
| 6,875,492 B1 | 4/2005 | Pirzada et al. |
| 7,050,248 B1 | 5/2006 | Wang |
| 7,112,376 B2 | 9/2006 | Moriwaki et al. |
| 7,147,790 B2 | 12/2006 | Wachenschwanz et al. |
| 7,186,348 B2 | 3/2007 | Chen et al. |
| 7,209,413 B2 | 4/2007 | Van Der et al. |
| 7,225,528 B2 | 6/2007 | Suwa et al. |
| 7,273,563 B2 | 9/2007 | Hattori et al. |
| 7,300,595 B2 | 11/2007 | Suwa et al. |
| 7,323,258 B2 | 1/2008 | Kamata et al. |
| 7,345,838 B2 | 3/2008 | Sakurai et al. |
| 7,385,785 B2 | 6/2008 | Hattori et al. |
| 7,388,725 B2 | 6/2008 | Sakurai et al. |
| 7,488,429 B2 | 2/2009 | Okawa et al. |
| 7,572,528 B2 | 8/2009 | Yamamoto et al. |
| 7,625,645 B2 | 12/2009 | Kikitsu |
| 7,771,602 B2 | 8/2010 | Kamata et al. |
| 2001/0048566 A1 | 12/2001 | Hirano et al. |
| 2002/0039264 A1 | 4/2002 | Ohsawa et al. |
| 2002/0081461 A1 | 6/2002 | Nishikawa et al. |
| 2002/0142192 A1 | 10/2002 | Kamata et al. |
| 2002/0150794 A1 | 10/2002 | Hamada et al. |
| 2002/0182443 A1 | 12/2002 | Ohkubo |
| 2003/0035973 A1 | 2/2003 | Trindade et al. |
| 2003/0038106 A1 | 2/2003 | Covington et al. |
| 2003/0190476 A1 | 10/2003 | Veerasamy et al. |
| 2004/0023162 A1 | 2/2004 | Hasegawa et al. |
| 2004/0050480 A1 | 3/2004 | Angelo et al. |
| 2004/0091748 A1 | 5/2004 | Kamata et al. |
| 2004/0131890 A1 | 7/2004 | Kikitsu et al. |
| 2004/0166372 A1 | 8/2004 | Haginoya et al. |
| 2004/0174636 A1 | 9/2004 | Suzuki et al. |
| 2004/0191577 A1 | 9/2004 | Suwa et al. |
| 2004/0247945 A1 | 12/2004 | Chen et al. |
| 2004/0253817 A1 | 12/2004 | Imada et al. |
| 2004/0257637 A1 | 12/2004 | Ishida et al. |
| 2005/0003106 A1 | 1/2005 | Isozaki |
| 2005/0013047 A1 | 1/2005 | Takai et al. |
| 2005/0045583 A1 | 3/2005 | Fujita et al. |
| 2005/0069732 A1 | 3/2005 | Kamata et al. |
| 2005/0086795 A1 | 4/2005 | Suwa et al. |
| 2005/0117253 A1 | 6/2005 | Moriya et al. |
| 2005/0219730 A1 | 10/2005 | Sakurai et al. |
| 2005/0219744 A1 | 10/2005 | Feldbaum et al. |
| 2005/0231856 A1 | 10/2005 | Kao et al. |
| 2005/0233176 A1 | 10/2005 | Takai et al. |
| 2005/0282038 A1 | 12/2005 | Yamamoto et al. |
| 2006/0012913 A1 | 1/2006 | Nakamura et al. |
| 2006/0014053 A1 | 1/2006 | Asakura et al. |
| 2006/0021966 A1 | 2/2006 | Hattori et al. |
| 2006/0028750 A1 | 2/2006 | Sakurai et al. |
| 2006/0063042 A1 | 3/2006 | Takai et al. |
| 2006/0076509 A1 | 4/2006 | Okino et al. |
| 2006/0148585 A1 | 6/2006 | Suwa et al. |
| 2006/0132953 A1 | 6/2006 | Asakura et al. |
| 2006/0172155 A1* | 8/2006 | Okino et al. ............ 428/836 |
| 2006/0215306 A1 | 9/2006 | Ehrlich et al. |
| 2006/0222897 A1 | 10/2006 | Kamata et al. |
| 2006/0269796 A1 | 11/2006 | Hyodo |
| 2007/0000861 A1 | 1/2007 | Kamata et al. |
| 2007/0053107 A1 | 3/2007 | Kimura et al. |
| 2007/0068797 A1 | 3/2007 | Jayasekara |
| 2007/0070547 A1 | 3/2007 | Kamata et al. |
| 2007/0190365 A1 | 8/2007 | Kodama et al. |
| 2007/0207263 A1 | 9/2007 | Heida et al. |
| 2007/0217075 A1* | 9/2007 | Kamata et al. ............ 360/135 |
| 2007/0224339 A1 | 9/2007 | Kamata et al. |
| 2007/0230055 A1 | 10/2007 | Shirotori et al. |
| 2007/0245545 A1 | 10/2007 | Pentek et al. |
| 2007/0281078 A1 | 12/2007 | Kikitsu et al. |
| 2008/0002297 A1 | 1/2008 | Shirotori et al. |
| 2008/0040914 A1 | 2/2008 | Kao et al. |
| 2008/0193801 A1 | 8/2008 | Haneda et al. |
| 2008/0241595 A1 | 10/2008 | Kimura et al. |
| 2008/0285174 A1 | 11/2008 | Shirotori et al. |
| 2009/0290255 A1* | 11/2009 | Sakawaki ............ 360/110 |

FOREIGN PATENT DOCUMENTS

| | | |
|---|---|---|
| CN | 1558399 | 12/2004 |
| CN | 1637870 | 7/2005 |
| CN | 1841514 A | 10/2006 |
| EP | 0 183 427 | 6/1986 |
| EP | 0 339 813 | 11/1989 |
| EP | 0 339 851 | 11/1989 |
| EP | 0 459 265 | 12/1991 |
| EP | 0 468 778 | 1/1992 |
| EP | 0 538 887 | 4/1993 |
| EP | 0 730 266 | 9/1996 |
| EP | 1 434 211 | 6/2004 |
| EP | 1463038 | 9/2004 |
| JP | 58-118028 | 7/1983 |
| JP | 59072644 A * | 4/1984 |
| JP | 62-232720 | 10/1987 |
| JP | 62-256225 | 11/1987 |
| JP | 01292625 A * | 11/1989 |
| JP | 02-232816 | 9/1990 |
| JP | 2-301018 | 12/1990 |
| JP | 3-142707 | 6/1991 |
| JP | 04-001922 | 1/1992 |
| JP | 04-034718 | 2/1992 |
| JP | 04-113515 | 4/1992 |
| JP | 04-274001 | 9/1992 |
| JP | 05-089452 | 4/1993 |
| JP | 05-151738 | 6/1993 |
| JP | 05242470 A * | 9/1993 |
| JP | 05-258291 | 10/1993 |
| JP | 6-28650 | 2/1994 |
| JP | 06-036263 | 2/1994 |
| JP | 06-076278 | 3/1994 |
| JP | 06-139567 | 5/1994 |
| JP | 06-244150 | 9/1994 |
| JP | 06-301969 | 10/1994 |
| JP | H7-85406 | 3/1995 |
| JP | 07-153047 | 6/1995 |
| JP | 07-331429 | 12/1995 |
| JP | 08-069614 | 3/1996 |
| JP | 08-115519 | 5/1996 |
| JP | 08-124340 | 5/1996 |
| JP | 8-209352 | 8/1996 |
| JP | 08-241512 | 9/1996 |
| JP | 08-255340 | 10/1996 |
| JP | 9-97419 | 4/1997 |
| JP | 09-167305 | 6/1997 |
| JP | 09-245345 | 9/1997 |
| JP | 10-209128 | 8/1998 |
| JP | 10-334460 | 12/1998 |
| JP | 11-039633 | 2/1999 |
| JP | 11-161943 | 6/1999 |
| JP | 11-161944 | 6/1999 |
| JP | 11-265878 | 9/1999 |
| JP | 11-273059 | 10/1999 |
| JP | 11-274152 | 10/1999 |
| JP | 11-348048 | 12/1999 |
| JP | 2000-195042 | 7/2000 |
| JP | 2000-211082 | 8/2000 |
| JP | 2000-232095 | 8/2000 |
| JP | 2000-269330 | 9/2000 |
| JP | 2000-285538 | 10/2000 |
| JP | 2000-306227 | 11/2000 |

| | | |
|---|---|---|
| JP | 2001-043526 | 2/2001 |
| JP | 2001-176049 | 6/2001 |
| JP | 2001-273682 | 10/2001 |
| JP | 3-271406 | 1/2002 |
| JP | 2002-288813 | 10/2002 |
| JP | 2003-016621 | 1/2003 |
| JP | 2003-100609 | 4/2003 |
| JP | 2003-109213 | 4/2003 |
| JP | 2003-155365 | 5/2003 |
| JP | 2004-110896 | 4/2004 |
| JP | 2004-164692 | 6/2004 |
| JP | 3581799 | 7/2004 |
| JP | 2004-234826 | 8/2004 |
| JP | 2004-288250 | 10/2004 |
| JP | 2004-295989 | 10/2004 |
| JP | 2004-295991 | 10/2004 |
| JP | 3576220 | 10/2004 |
| JP | 2005-011459 | 1/2005 |
| JP | 2005-050468 | 2/2005 |
| JP | 2005-56535 | 3/2005 |
| JP | 2005-108335 | 4/2005 |
| JP | 2005-135455 | 5/2005 |
| JP | 1612225 | 5/2005 |
| JP | 3686067 | 6/2005 |
| JP | 2005-196885 | 7/2005 |
| JP | 2005-243086 | 9/2005 |
| JP | 2005-243131 | 9/2005 |
| JP | 2005-276325 | 10/2005 |
| JP | 2005-293633 | 10/2005 |
| JP | 2006-048861 | 2/2006 |
| JP | 2006-216105 | 8/2006 |
| JP | 2006-277868 | 10/2006 |
| JP | 2006-331578 | 12/2006 |
| JP | 2007-66475 | 3/2007 |
| WO | 02/23538 | 3/2002 |

OTHER PUBLICATIONS

Office Action in Chinese Patent Application No. 200810099507.1, dated Nov. 27, 2009, and English-language translation.

Hattori et al., *Fabrication of Discrete Track Perpendicular Media of High Recording Density*, IEEE Transactions on Magnetics, vol. 40, No. 4, Jul. 2004, pp. 2510-2515.

Office Action dated Jan. 25, 2011 in Japanese Patent Application No. 2009-243593, and English-language translation thereof.

Office Action dated May 8, 2009 in Japanese Patent Application No. 2007-128318, and English-language translation thereof.

Office Action dated Sep. 7, 2010 in Japanese Patent Application No. 2009-243593, and English-language translation thereof.

\* cited by examiner

US 8,049,993 B2

MAGNETIC RECORDING MEDIUM AND MAGNETIC STORAGE DEVICE

RELATED APPLICATION(S)

The present disclosure relates to the subject matters contained in Japanese Patent Application No. 2007-128318 filed on May 14, 2007, which is incorporated herein by reference in its entirety.

FIELD

The present invention relates to a patterned servo-type magnetic recording medium whose servo portion is patterned in response to whether or not a magnetic substance is provided or grooves are formed and a storage device provided with the magnetic recording medium.

BACKGROUND

Due to a significant functional improvement of information equipments, such as a personal computer, in recent years, an amount of information handled by a user is enormously increasing. In such circumstances, a storage device having recording density that is tremendously higher than those being conventionally available and a semiconductor device having higher integration degree are required.

There is a magnetic recording medium as a component implemented in the storage device. As the recent magnetic recording medium applied for the purpose of improving a recording density, a discrete track type patterned medium (DTR medium) in which the recording tracks are physically separated has been developed. An example of such DTR medium is disclosed in JP-A-7-085406.

This DTR medium is configured by a soft magnetic substance formed on recording track portions on a substrate, a ferromagnetic substance pattern formed thereon, a nonmagnetic substance formed to fill in spaces between the recording track portions, and a protection layer formed on the ferromagnetic substance pattern and the nonmagnetic substance. Basically this configuration is also applicable to the servo portion.

In the servo portion of the DTR medium in the conventional configuration, the servo patterns are formed dependent on whether or not the magnetic substance is formed. Therefore, it is common that the DC demagnetization is performed not to use the servo track writer. In contrast, in writing the data on the recording track layer, the data are written by using the magnetic head.

Therefore, in writing the recording data by using the magnetic head after the servo data are written in the servo portion, such a problem existed that the servo data being written on the servo track are overwritten by the magnetic head. In order to solve this problem, when the protection layer formed on the servo portion and the recording track is thickened, such a problem also existed that either the recording data cannot be written on the recording track by the magnetic head owing to a magnetic spacing or a playback signal is weakened in reproducing the recording data being written on the recording track.

SUMMARY

According to one aspect of the invention, there is provided a magnetic recording medium including: a substrate; a recording layer that is formed on the substrate to have a grooved pattern; and a protection layer formed on the recording layer to fill in the grooved pattern, wherein the recording layer is defined to have a servo portion that retains servo data and a recording track portion that retains recording data, and wherein a first film thickness of the protection layer at the servo portion is larger than a second film thickness of the protection layer at the recording track portion by a thickness that is in a range from 1 nm to 10 nm.

DETAILED DESCRIPTION OF THE EMBODIMENTS

An embodiment of the present invention will be described with reference to the accompanying drawings.

Figure 1:
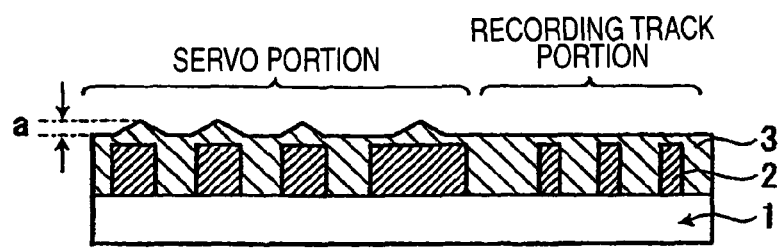
FIG. 1 is a partial sectional view of a magnetic recording medium according to the embodiment of the present invention.

FIG. 1 is a sectional view showing an example of a pattern in a servo portion and a track portion of a DTR medium.

A ferromagnetic layer 2 is formed on a substrate 1 at a recording track portion and a servo portion via a soft magnetic layer (not shown). The ferromagnetic layer 2 serves as a recording layer that retains recording data in the recording track portion, while the ferromagnetic layer 2 serves as a recording layer that retains servo data in the servo portion. The soft magnetic layer performs a part of the functions of the magnetic head such that passes a recording magnetic field, which is applied from the magnetic head, e.g., a single pole head to magnetize the ferromagnetic layer 2 as a vertical magnetic recording layer, in the horizontal direction to return to the magnetic head. The soft magnetic layer can apply sharp and enough vertical magnetic field to the recording layer and thus improving a recording/playing efficiency.

As the material of the substrate 1, for example, an Al alloy substrate, a ceramic, a carbon, a Si-single crystal substrate having an oxidized surface, any of these substrates that is plated with NiP, or the like, and the like can be used. As the glass substrate, there are an amorphous glass and a crystallized glass, and a soda-lime glass and an aliminosilicate glass can be used as the amorphous glass. Also, as the crystallized glass, a lithium crystallized glass can be used. As the ceramic substrate, a sintered alloy containing a general aluminum oxide, an aluminum nitride, a silicon nitride, or the like as a principal component, their fiber-reinforced alloys, and the like can be used. As the substrate, the metal substrate or the nonmetallic substrate on the surface of which a NiP layer is formed by the plating method or the sputtering method can be used.

As the material of the soft magnetic layer, the material containing Fe, Ni, Co can be used. As the typical material, a FeCo alloy (e.g., FeCo, FeCoV, or the like), a FeNi alloy (e.g., FeNi, FeNiMo, FeNiCr, FeNiSi, or the like), a FeAl alloy or a FeSi alloy (e.g., FeAl, FeAlSi, FeAlSiCr, FeAlSiTiRu, FeAlO, or the like), a FeTa alloy (e.g., FeTa, FeTaC, FeTaN, or the like), and a FeZr alloy (e.g., FeZrN, or the like) can be listed. Also, the material having a crystalline structure such as FeAlO, FeMgO, FeTaN, FeZrN, or the like containing Fe at 60 at % or more, or a granular structure in which fine crystal grains are distributed in the matrix can be used. Also, as other material of the soft magnetic layer, a Co alloy containing Co and at least one of Zr, Hf, Nb, Ta, Ti, and Y can be used. It is desirable that Co in the Co alloy should be contained at 80 at %. Such Co alloy has readily an amorphous state when a film is formed by the sputtering method, and this Co alloy shows the very excellent soft magnetism because it has no crystal magnetic anisotropy, crystal defect, and grain boundary. Also, a noise reduction of the medium can be attained by using the amorphous soft magnetic substance. As the preferred amorphous soft magnetic substance, for example, a CoZr alloy, a CoZrNb alloy, a CoZrTa alloy, and the like can be listed, and it is preferable that a CoZrNb layer of about 120 nm thickness should be formed.

An underlying layer can be provided under the soft magnetic layer to improve a crystallinity of the soft magnetic layer or an adhesion to the substrate. As the material of the underlying layer, Ti, Ta, W, Cr, Pt, or an alloy containing them or an oxide or a nitride of these materials can be used. An intermediate layer made of nonmagnetic substance can be provided between the soft magnetic layer and the recording layer. The intermediate layer has two roles of blocking an exchange bonding interaction between the soft magnetic layer and the recording layer and controlling the crystallinity of the recording layer. As the material of the intermediate layer, Ru, Pt, Pd, W, Ta, Cr, Si or an alloy containing them or an oxide or a nitride of these materials can be used.

In order to prevent a spike noise, the soft magnetic layer may be divided into a plurality of layers and then these layers may be antiferromagnetic-bonded by inserting a Ru layer of 0.5 to 1.5 nm thickness between them respectively. Also, a pin layer made of a hard magnetic film having an in-plane anisotropy such as CoCrPt, SmCo, FePt, or the like or an antiferromagnetic substance such as IrMn, PtMn, or the like may be exchange-bonded to the soft magnetic layer. At that time, in order to control an exchange bonding strength, a ferromagnetic film (e.g., a Co film) or a nonmagnetic film (e.g., a Pt film) may be stacked on and under the Ru layer.

As the material of the ferromagnetic layer 2, the material having Co as a principal component and containing at least Pt and further containing an oxide may be considered. As this oxide, particularly a silicon oxide or a titanium oxide is preferable.

It is preferable that magnetic particles (crystal grains having magnetism) should be dispersed in the ferromagnetic layer 2 for the vertical magnetic recording. It is preferable that the magnetic particle should have a column-like structure to pass through the vertical magnetic recording layer vertically. With such structure, an alignment and a crystallinity of the magnetic particles of the vertical magnetic recording layer can be improved, and as a result a signal/noise ratio (S/N ratio) suitable for the high density recording can be obtained. In order to get the above column-like structure, a quantity of contained oxide is important. It is preferable that a quantity of contained oxide should be set to 3 mol % or more but 12 mol % or less of a total quantity of Co, Cr, Pt. More preferably, a quantity of contained oxide should be set to 5 mol % or more but 10 mol % or less. The reason why the above range of a quantity of contained oxide in the vertical magnetic recording layer is preferable is that the oxide is deposited around the magnetic particle in forming the layer and the magnetic particle can be isolated and made finer. When a quantity of contained oxide is in excess of the above range, the oxide still remains in the magnetic particle to spoil the alignment and the crystallinity of the magnetic particles and also the oxide is deposited on and under the magnetic particle, and as a result the column-like structure of the magnetic particle passing through the vertical magnetic recording layer vertically is not formed. Also, when a quantity of contained oxide is below the above range, the magnetic particles are insufficiently separated and miniaturized, and as a result a noise is increased in recording/playing the data and a signal/noise ratio (S/N ratio) suitable for the high density recording cannot be obtained. It is preferable that a quantity of contained Cr in the vertical magnetic recording layer should be set to 0 at % or more but 16 at % or less. More preferably, a quantity of contained Cr should be set to 10 at % or more but 14 at % or less. The reason why the above range of a quantity of contained Cr is preferable is that an uniaxial crystal magnetic anisotropy constant Ku of the magnetic particle is not excessively lowered and a high magnetization can be maintained, and as a result the recording/playing characteristic suitable for the high density recording and the sufficient thermal fluctuation characteristic can be obtained. When a quantity of contained Cr is in excess of the above range, a constant Ku of the magnetic particle becomes small and the thermal fluctuation characteristic becomes worse and also the alignment and the crystallinity of the magnetic particles are worsened, and as a result the recording/playing characteristic is worsened. It is preferable that a quantity of contained Pt in the vertical magnetic recording layer should be set to 10 at % or more but 25 at % or less. The reason why the above range of a quantity of contained Pt is preferable is that a constant Ku necessary for the ferromagnetic layer 2 can be obtained and the crystallinity and the alignment of the magnetic particles are improved, and as a result the thermal fluctuation characteristic and the recording/playing characteristic suitable for the high density recording can be obtained. When a quantity of contained Pt is in excess of the above range, the layer of an fcc structure is formed in the magnetic particles and thus it is possible that the alignment and the crystallinity are spoiled. Also, when a quantity of contained Pt is below the above range, a constant Ku required to get the thermal fluctuation characteristic suitable for the high density recording cannot be obtained.

The ferromagnetic layer 2 may contain one element or more selected from B, Ta, Mo, Cu, Nd, W, Nb, Sm, Tb, Ru, and Re, in addition to Co, Cr, Pt, and the oxide. Because the above element is contained, the miniaturization of the magnetic particles can be accelerated or the alignment and the crystallinity can be improved, and thus the recording/playing characteristic and the thermal fluctuation characteristic suitable for the higher density recording can be obtained. It is preferable that a total quantity of contained elements should be set to 8 at % or less. When the total quantity is in excess of 8 at %, the phases except the hcp phase are formed in the magnetic particles. Therefore, the crystallinity and the alignment of the magnetic particles are disturbed, and as a result the recording/playing characteristic and the thermal fluctuation characteristic suitable for the high density recording cannot be obtained.

Also, as the ferromagnetic layer 2, a CoPt alloy, a CoCr alloy, a CoPtCr alloy, a multi-layered structure configured by Co and an alloy having at least one type selected from a group including CoPtO, CoPtCrO, CoPtSi, CoPtCrSi, and Pt, Pd, Rh, and Ru as a principle component, CoCr/PtCr, CoB/PdB, CoO/RhO, etc. obtained by adding Cr, B, and O to these alloys, and the like can be used in addition to the above. Preferably a thickness of the ferromagnetic layer 2 should be set to 5 to 60 nm, and more preferably the thickness should be set to 10 to 40 nm. When the thickness is in this range, the ferromagnetic layer 2 can operate as the magnetic storage device suitable for the higher density recording. There is such a tendency that a playback output is too low and thus a noise component becomes higher when a thickness of the ferromagnetic layer 2 is below 5 nm, while there is such a tendency that the playback output is too high and thus a waveform is distorted when a thickness of the ferromagnetic layer 2 exceeds 40 nm. It is preferable that a coercive force of the ferromagnetic layer 2 should be set to 237000 A/m (3000 Oe) or more. When the coercive force is below 237000 A/m (3000 Oe), the thermal fluctuation tolerance tends to deteriorate. It is preferable that a squareness of the ferromagnetic layer 2 should be set to 0.8 or more. When the squareness is below 0.8, the thermal fluctuation tolerance tends to deteriorate.

A protection layer 3 is formed such that this layer is filled between patterns of the ferromagnetic layer 2. The protection layer 3 is provided for the purpose of preventing a corrosion of the ferromagnetic layer 2 and also preventing the damage of a surface of the medium caused when the magnetic head contacts the medium. As the material, for example, the material containing C, $SiO_2$, $ZrO_2$ can be listed. It is preferable that a thickness of the protection layer 3 should be set to 1 to 10 nm. Hence, a distance between the head and the medium can be reduced, such medium is suitable for the high density recording. The carbon can be classified into a sp2 carbon (graphite) and a sp3 carbon (diamond). The sp3 carbon is superior in a durability and a corrosion resistance but is inferior in a surface smoothness to the graphite because such carbon is formed of the crystalline substance. Normally a carbon film is formed by the sputtering method using a graphite target. According to this method, an amorphous carbon in which the sp2 carbon and the sp3 carbon are mixed together is formed. The carbon whose rate of the sp3 carbon is large is called a diamond-like-carbon (DLC). Since the sp3 carbon is excellent in the durability and the corrosion resistance and is in an amorphous state, such carbon is also excellent in the surface smoothness. Thus, the sp3 carbon is utilized as a surface protection layer of the magnetic recording medium. A material gas is excited/decomposed in the plasma during the film formation of the DLC by the CVD (Chemical Vapor Deposition) method and thus the DLC is generated by the chemical reaction. Therefore, the DLC that is richer in the sp3 carbon can be formed by controlling the conditions.

As the concrete material of the protection layer 3, a metal such as Cr, Ru, Pt, Pd, Ti, Ta, Mo, W, or the like, a multi-component metal such as NiTa, NiNb, NiNbTi, NiNbTiHf, CuHfZrTi, or the like, an oxide such as $SiO_2$, $TiO_x$, $Al_2O_3$, or the like, a nitride such as $Si_3N_4$, AlN, TiN, or the like, a carbon such as TiC, or the like, a boride such as BN, or the like, and a single element such as C, Si, or the like can be listed. Such material is not particularly limited, but the metal material is preferable to enhance strength of the playback signal. Also, the surface smoothness can be improved when the buried material is alloyed. Therefore, the material that is alloyed easily is preferable as the metal material, and the multi-component metal such as a metal glass, or the like is more preferable.

The protection layer 3 is formed to cover the pattern of the ferromagnetic layer 2. In this case, a thickness of the protection layer 3 on the ferromagnetic layer 2 formed in the servo portion is set larger than a thickness of the protection layer 3 on the ferromagnetic layer 2 formed in the recording track within a range of 1 nm or more but 10 nm or less. In the DTR medium, the rewritable data "1", "0" must be recorded/played in the recording track portion, and therefore the recording must be executed by the magnetic head. In contrast, the data are patterned based on the presence/absence of the magnetic substance in the servo portion, and therefore there is no need to rewrite the signal after the servo data are written once by applying the DC-transparent magnetic field in one way. The magnetic head can apply only the magnetic field of about 2T due to the material characteristic of a magnetoresistive element. In this case, since the servo portion is patterned depending on the presence/absence of the magnetic substance, the strong magnetic field can be applied in one way, and thus the strong magnetic field can be applied collectively by the magnet, or the like. In other words, the magnetic field applied to the ferromagnetic layer 2 is weakened because of a magnetic spacing, it is difficult to write the servo data unless the magnetic field larger than the magnetic field that the magnetic head can generate normally can be generated. As described above, since the servo portion is patterned depending on the presence/absence of the magnetic substance, the strong magnetic field can be applied in one way and thus the strong magnetic field can be applied all together by the magnet, or the like, so that it is feasible to write the servo signal without the consideration for the load to the magnetic head. As a result, the protection layer 3 in the servo portion can be formed thick.

The corrosion of the magnetic substance in the servo portion and an overwrite phenomenon by the recording/playing head can be suppressed by thickening a film thickness of the protection layer 3. In contrast, in the track portion on which the data signal must be recorded by using the magnetic head, it is impossible to overwrite (OW) the medium having a coercive force of 4.5 kOe when a thickness of the protection layer 3 becomes 20 nm. Also, normally it is said that, when a magnetic spacing is increased by 1 nm, a BER (bit error rate) is deteriorated by 0.3 dB. Therefore, it is preferable that the protection layer should be formed thick in the servo portion, nevertheless a film thickness of the protection layer must be set as thin as possible in the data recording area to reduce a magnetic spacing.

However, when a difference in film thickness of the protection layer between the servo portion and the recording track portion is present in excess of 10 nm, such difference is equivalent to a floating height of the magnetic head, so that the magnetic head cannot plane stably over the magnetic recording medium. Therefore, it is preferable that a difference in film thickness of the protection layer overlying the recording layer should be set to 10 nm or less. Also, when the nonmetal material is used as the protection layer, a strength of the reading signal is reduced because the protection layer becomes thick. As a result, it is more desirable that the protection layer should be formed of the metal material and a difference in film thickness of the protection layer overlying the recording layer should be set to 4 nm or less.

According to the above structure, the magnetic recording medium in which the overwrite in the servo portion and the corrosion of the ferromagnetic layer 2 are hard to occur but the recording/playing in the recording track portion can be performed as in the past can be provided.

Next, a method of manufacturing a magnetic recording medium according to the embodiment will be described with reference to FIG. 2 to FIG. 8.

Figure 2:
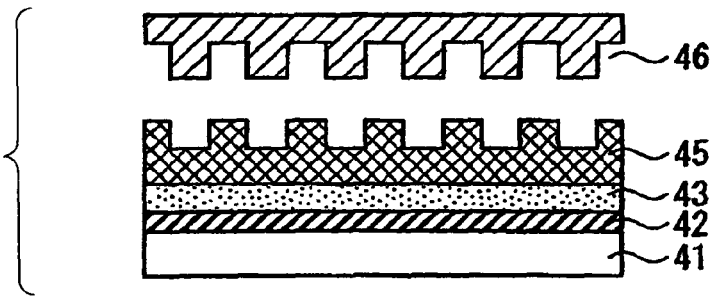
FIG. 2 is a view showing steps of manufacturing the magnetic recording medium.

First, in FIG. 2, a soft magnetic layer 42 and a ferromagnetic layer 43 are formed on a surface of a substrate 41. A surface of the ferromagnetic layer 43 may be covered with a protection layer made of carbon. A resist 45 is coated on the surface of the ferromagnetic layer 43 by the spin coating method. The normal Novorak-based photoresist can be used as the resist, but SOG (Spin-On-Glass) may be used. After the resist 45 is formed, a stamper 46 on which the recording track and the pattern of the servo information are embedded, for example, is pressed at 100 MPa for 60 sec. Thus, as shown in FIG. 2, the pattern is transferred onto a surface of the resist 45. The press is performed by arranging the substrate 41, on which the stamper 46 and the resist 45 are formed, between an upper plate and a lower plate of the die set. In the substrate 41 on which the stamper 46 and the resist 45 are formed, an uneven surface of the stamper 46 is opposed to the resist film side of the substrate 41.

Figure 3:
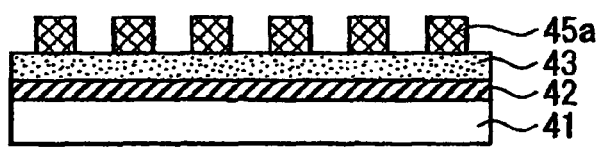
FIG. 3 is a view showing steps of manufacturing the magnetic recording medium.

After the press of the die set using the upper plate and the lower plate is completed, the resist 45 is patterned, as shown in FIG. 3. Since a height of the groove of the pattern formed by the imprint is 60 nm to 70 nm, a height of the residue is about 70 nm. If either the fluorine-based remover is coated or the fluorine-mixed DLC is formed on the stamper 46, the stamper 46 can be released smoothly from the resist 45.

Then, as shown in FIG. 3, the residue of the resist 45 is removed by the RIE (Reactive Ion Etching) using an oxygen gas, and only an imprinted resist pattern 45a is left on the ferromagnetic layer 43. When the SOG is used as the resist, the residue is removed by the RIE using a CF4 gas. The ICP (Inductively Coupled Plasma) that can generate the high-density plasma at a low pressure is preferable as a plasma source in the RIE, but the ECR (Electron Cyclotron Resonance) plasma may also be used.

Figure 4:
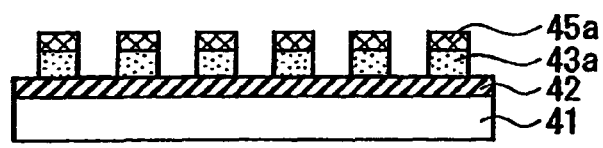
FIG. 4 is a view showing steps of manufacturing the magnetic recording medium.

After the residue of the resist 45 is removed, the magnetic substance processing of the ferromagnetic layer 43 is performed by using the resist pattern 45a, as shown in FIG. 4. Thus, a ferromagnetic layer pattern 43a is formed. In the magnetic substance processing, the etching using an Ar ion beam (Ar ion milling) is preferable, but the RIE using a mixed gas of a chlorine gas or CO and $NH_3$ may be applied. In the case of the RIE using a mixed gas of CO and $NH_3$, a hard mask made of Ti, Ta, W, or the like must be used as the etching mask in the magnetic substance processing, instead of the resist pattern 45a. In the case of the magnetic substance processing using the above RIE, no taper is formed on a side surface of the etched ferromagnetic layer pattern 43a. When the magnetic substance processing is performed by the Ar ion milling that can etch all materials, the etching is performed at an acceleration voltage 400 V while changing an ion incident angle from 30 degrees to 70 degrees, for example. The ion milling using the ECR ion gun can process the ferromagnetic layer pattern on the side surface of which the taper is seldom formed when the ion milling is executed at an ion incident angle of 90 degrees.

Figure 5:
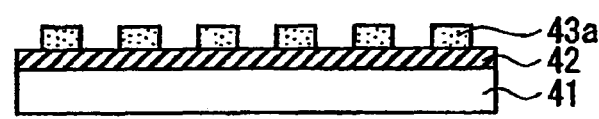
FIG. 5 is a view showing steps of manufacturing the magnetic recording medium.

After the magnetic substance processing is completed, the resist pattern 45a is peeled off from the ferromagnetic layer pattern 43a, as shown in FIG. 5. When the normal Novorak-based photoresist is used, the resist pattern can be peeled easily by applying the oxygen plasma process. At this time, when a carbon protection layer is provided on a surface of the resist 45, the care must be taken not to peel off the carbon protection layer together. In contrast, when the SOG is used as the etching mask, this step must be performed by the RIE using a fluorine gas. As the fluorine gas, $CF_4$ or $SF_6$ is preferable. In this case, sometimes an acid such as HF, $H_2SO_4$, or the like is generated by the reaction of the fluorine with the moisture in the atmosphere, and therefore the resultant structure must be rinsed after the resist pattern is peeled off.

Figure 6:
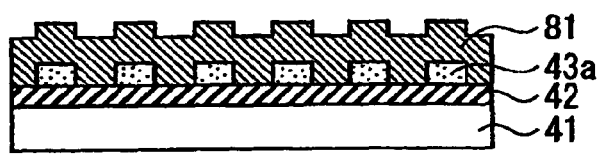
FIG. 6 is a view showing steps of manufacturing the magnetic recording medium.

After the resist pattern 45a is peeled, a protection layer 81 is filled to cover the grooves of the ferromagnetic layer pattern 43a, as shown in FIG. 6. In this filling step, the protection layer 81 is formed by the common sputtering or CVD (Chemical Vapor Deposition) method. The material of the protection layer 81 can be selected widely from a metal such as Cr, Ru, Pt, Pd, Ti, Ta, Mo, W, or the like, a multi-component metal such as NiTa, NiNb, NiNbTi, NiNbTiHf, CuHfZrTi, or the like, an oxide such as $SiO_2$, $TiO_x$, $Al_2O_3$, or the like, a nitride such as Si3N4, AlN, TiN, or the like, a carbon such as TiC, or the like, a boride such as BN, or the like, and a single element such as C, Si, or the like. Also, in this filling step, the bias sputtering can also be used. This bias sputtering gives the method that forms the film while applying a bias voltage to the substrate 41, and the film can be formed while filling the grooves easily. However, because the application of the bias voltage is ready to cause a melting of the substrate 41 or a sputter dust, it is preferable that the normal sputtering should be used.

Figure 7:
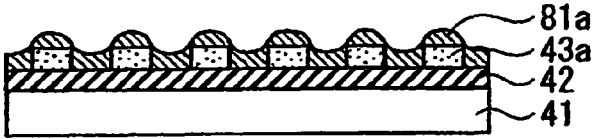
FIG. 7 is a view showing steps of manufacturing the magnetic recording medium in FIG. 1.

After the grooves are filled by the protection layer 81, a protection layer pattern 81a is formed by etching back the protection layer 81, as shown in FIG. 7. At this time, the etching-back is stopped just before the ferromagnetic layer pattern 43a is exposed. An end timing of this etching-back is different in the servo portion and the recording track portion respectively such that an end timing of the servo portion is set earlier than an end timing of the recording track portion. The reason for this is that, as described above, a thickness of the protection layer 81 in the servo portion should be set thicker than a thickness of the protection layer 81 in the recording track portion. In this etching-back step, it is desired that the etching should be performed by arranging the ECR ion gun such that the etchant is incident perpendicularly on the substrate 1. An Ar ion milling may be used instead of the ECR ion milling.

Figure 8:
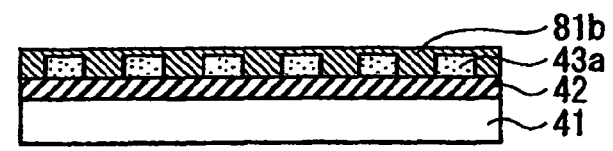
FIG. 8 is a view showing steps of manufacturing the magnetic recording medium.

When the step of filling the protection layer 81, shown in FIG. 6, and the step of etching back the protection layer 81, shown in FIG. 7, are repeated twice or more, a filling structure in which the ferromagnetic layer pattern 43a is covered with a protection layer pattern 81b can be obtained, as shown in FIG. 8.

After the filling structure in FIG. 8 is formed, a carbon protection layer (not shown) may be formed on the protection layer pattern 81b. It is desirable that the carbon protection layer should be formed by the CVD method to improve a coverage on the protection layer pattern 81b, but the sputtering or the vacuum deposition method may be applied. When the carbon protection layer is formed by the CVD method, the DLC film containing a large amount of the sp3 carbon is formed. The coverage is worsened when a film thickness is 1 nm or less, while a magnetic spacing between the recording/playing head and the magnetic recording medium is increased to lower the SNR when a film thickness is 10 nm or more. Also, a lubrication layer can be provided on the protection layer. As the lubricant used in the lubrication layer, the well-known material in the prior art, for example, perfluoropolyether, alcohol fluoride, fluorinated carboxylic acid, or the like can be used.

The above described magnetic recording medium may be installed into a magnetic storage device, which will be described hereunder.

Figure 9:
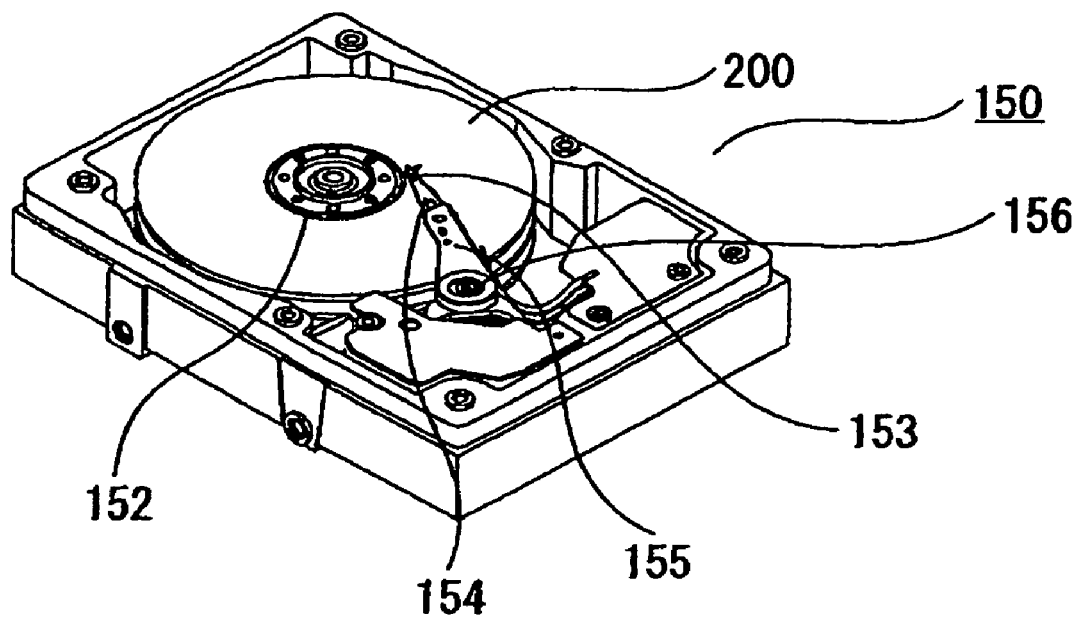
FIG. 9 is a pertinent perspective view illustrating a schematic configuration of a magnetic storage device.

FIG. 9 is a pertinent perspective view illustrating a schematic configuration of such magnetic storage device. A magnetic storage device 150 shown in FIG. 9 is the device of type using a rotary actuator. In FIG. 9, a magnetic disk 200 is loaded on a spindle 152 and is rotated by a motor (not shown), which responds to a control signal fed from a driving device controlling unit (not shown), in the direction indicated with an arrow A. In this case, only a single magnetic disk 200 is used in the magnetic storage device 150 shown in FIG. 9, but a plurality of magnetic disks 200 may be installed.

A head slider 153 for recording/playing the information to be stored in the magnetic disk 200 is fitted to a top end of a thin film-like suspension 154. The magnetic head containing the magnetoresistive element according to any of above embodiments is mounted near the top end of the head slider 153.

When the magnetic disk 200 is rotated, a medium opposing surface (ABS: Air Bearing Surface) of the head slider 153 is held at a predetermined floating height from a surface of the magnetic disk 200. In this case, a so-called "contact type", i.e., the slider contacts the magnetic disk 200 may be used instead of such floating type. The suspension 154 is connected to one end of an actuator arm 155 that is equipped with a bobbin portion to hold a driving coil (not shown), and the like. A voice coil motor 156 as one type of a linear motor is provided to the other end of the actuator arm 155. The voice coil motor 156 is configured by a driving coil (not shown) being wound up in the bobbin portion of the actuator arm 155, and a magnetic circuit including a permanent magnet and an opposing yoke being arranged to oppose with each other while sandwiching the coil therebetween.

The actuator arm 155 is held by ball bearings (not shown) provided to two locations on and under the spindle 152 such that it can be turned/slid by the voice coil motor 156.

Next, Examples of this application will be given hereunder.

Example 1

As an Example 1, the DTR medium only on the servo portion of which the protection layer was formed thick was manufactured by the above method of manufacturing the magnetic recording medium shown in FIG. 3 to FIG. 8. The protection layer was formed of Ru. The film formation of a 50 nm thickness by the sputtering method and the etching back of 30 nm thickness are repeated five times respectively, and finally a surface of the recording track was planarized by executing the etching back of 100 nm thickness. At this time, when Rmax of a 5 μm square was measured by using the atomic force microscope (AFM), it was confirmed that the track portion was 3 nm and the servo portion was 7 nm and therefore the protection layer overlying the recording layer in the servo portion was thicker than that in the track portion by 4 nm in terms of Rmax (see Table 1).

TABLE 1

| | protection layer | track portion Rmax | servo portion Rmax | DLC film thickness |
|---|---|---|---|---|
| Example 1 | Ru | 3 nm | 7 nm | 5 nm |
| Example 2 | NiNbTiHf | 3 nm | 6 nm | 5 nm |
| Example 3 | Ru | 4 nm | 14 nm | 5 nm |
| Comparative example 1 | SiO2 | 4 nm | 4 nm | 5 nm |
| Comparative example 2 | SiO2 | 4 nm | 4 nm | 15 nm |
| Comparative example 3 | SiO2 | 4 nm | 24 nm | 5 nm |

After the filling process, the DLC was formed by the CVD method, and the lubricant was coated as the protection layer. When this medium was measured in the atmospheric pressurization by the digital Laser Doppler Vibration meter (LDV), the resonance caused due to the unevenness of the servo portion was not found. Also, when the floating evaluation was made by the glide height tester using the magnetic head having a floating height of 15 nm, the crash due to the unevenness of the protection layer was not found. When the DC demagnetization was executed by the magnet using the spin stand and the drive durability test was executed by installing the head into the drive, the enough strength could be obtained from both the servo portion signal and the track portion overwrite (OW) signal and the bit error rate (BER) of −5.5-th power was obtained. When Cr was used as the protection layer, the similar results could be obtained.

Example 2

As an Example 2, the DTR medium only on the servo portion of which the protection layer is thick was formed by the method shown in FIG. 3 to FIG. 8, and NiNbTiHf was used as the protection layer (Table 1). The film formation of a 50 nm thickness by the sputtering method and the etching back of 30 nm thickness are repeated five times respectively, and finally a surface of the recording track was planarized by executing the etching back of 100 nm thickness. At this time, when Rmax of the 5 μm square was measured by using the atomic force microscope (AFM), it was confirmed that the track portion was 3 nm and the servo portion was 6 nm and therefore the protection layer overlying the recording layer in the servo portion was thicker than that in the track portion by 3 nm in terms of Rmax. When Ra of a 100 nm square overlying the recording layer was measure by the AFM, it was confirmed that the surface flatness is excellent like 0.3 nm. After the filling process, the DLC was formed by the CVD method, and the lubricant was coated as the protection layer. When this medium was measured in the atmospheric pressurization by the digital Laser Doppler Vibration meter (LDV), the resonance caused due to the unevenness of the servo portion was not found. Also, when the floating evaluation was made by the glide height tester using the magnetic head having a floating height of 15 nm, the crash due to the unevenness of the protection layer was not found. When the DC demagnetization was executed by the magnet using the spin stand and the drive durability test was executed by installing the head into the drive, the BER of −6.0-th power was obtained.

Example 3

As an Example 3, the DTR medium only on the servo portion of which the protection layer is thick by 10 nm was formed by the method shown in FIG. 2 to FIG. 8. Ru was used as the protection layer (Table 1). In order to get a difference in film thickness between the protection layer overlying the recording layer and the protection layer overlying the non-recording layer, the film formation of a 50 nm thickness by the sputtering method and the etching back of 30 nm thickness are repeated three times respectively. Thus, a difference of 10 nm of Rmax between the recording track layer and the servo portion was obtained. Finally a surface on the recording track was planarized by executing the etching back of 100 nm thickness. After the filling process, the DLC was formed by the CVD method, and the lubricant was coated as the protection layer. When the DC demagnetization was executed by the magnet using the spin stand and the drive durability test was executed by installing the head into the drive, the BERs of −5.0-th power and −4.0-th power were obtained from the media using Ru and SiO₂ as the protection layer respectively.

Also, when the DTR medium whose protection layer is thick by 10 nm was measured in the atmospheric pressurization by the digital Laser Doppler Vibration meter (LDV), the resonance caused due to the unevenness of the servo portion was not found. Also, when the floating evaluation was made by the glide height tester using the magnetic head having a floating height of 15 nm, the crash due to the unevenness of the protection layer was not found.

Next, Comparative Examples will be given hereunder.

Comparative Example 1

Except the filling/planarization were executed by the bias sputtering method to align the unevenness in the track portion and the servo portion, the DTR medium whose protection layer is thin in both the track portion and the servo portion was formed by the same method as Example 1. $SiO_2$ was used as the protection layer and Rmax after the planarization by the filling was 4 nm in both the track portion and the servo portion (Table 1).

The DC demagnetization was executed by the magnet, then the data were written on the track portion by the recording/playing head using the spin stand, and then the data were written on the servo portion. When the overwrite (OW) signal of the formed DTR medium was set to 1, the signal strength comparison was made (see Table 2).

TABLE 2

|  | track portion OW signal ratio | servo portion signal ratio | servo portion OW signal ratio |
|---|---|---|---|
| Example 1 | 1 | 1 | 1 |
| Comparative example 1 | 1 | 1 | 3/2 |
| Comparative example 2 | 1/2 | 1/2 | 1/2 |

In the medium in Example 1, the enough OW signal could be obtained. With regard to the servo portion, the medium in Example 1 was hard to OW rather than the medium in Comparative Example 1.

Comparative Example 2

Except the CVD protection layer after the filling was thick by 10 nm, the DTR medium whose protection layer is thick in both the track portion and the servo portion was formed by the same method as that in Comparative Example 1.

The DC demagnetization was executed by the magnet, then the data were written on the track portion by the recording/playing head using the spin stand, and then the data were written on the servo portion. When the overwrite (OW) signal of the formed DTR medium was set to 1, the signal strength comparison was made (Table 2).

The enough OW signal was obtained from the track portion of the medium in Comparative Example 2.

Comparative Example 3

The DTR medium only on the servo portion of which the protection layer is thick by 20 nm was formed by the method shown in FIG. 2 to FIG. 8. $SiO_2$ was used as the protection layer. In order to obtain a difference in film thickness between the protection layer overlying the recording layer and the protection layer overlying the non-recording layer, the film formation of a 50 nm thickness by the sputtering method and the etching back of 30 nm thickness are executed once respectively. Thus, a difference of unevenness of 20 nm was obtained (Table 1). The corrosion test in the high-temperature and high-humidity circumstance, the floating stability evaluation using the AE sensor, and the signal strength comparison in the servo portion by the spin stand were applied to the resultant medium (Table 3).

TABLE 3

|  | servo portion corroded | head floating stabilized | servo portion signal ratio |
|---|---|---|---|
| Example 1 | No | Yes | 1 |
| Example 3 | No | Yes | 1 |
| Comparative example 3 | No | No | 1/3 |
| Example with no filling | Yes | No | 1 |

The corrosion was found from the servo portion and the track portion of the medium to which no filling was applied, but no corrosion was found from the buried medium. When the evaluation was continued further, the track portion whose protection layer is thin was corroded at first, but no corrosion was found from the servo portion. Also, in the floating stability evaluation using the AE sensor, the AE signal was observed from the medium in Comparative Example 3 whose difference in unevenness is 20 nm, but no AE signal was observed from the medium whose difference in unevenness is 10 nm and the magnetic head was floated stably. Also, in the spin stand evaluation executed after the DC demagnetization was applied to the medium, a difference in unevenness of the metal film in Example 1 and Example 3 was 10 nm and thus the signal was not decreased, but a reduction of the signal strength was found in Comparative Example 3 in which the oxide was buried.

In this case, the present invention is not limited to the embodiments as they are, and the constituent elements can be varied and modified in a scope without departing from a gist of the invention at the practicing stage. Various inventions can be formed by combining appropriately a plurality of constituent elements disclosed in the embodiments. For example, several constituent elements may be deleted from all constituent elements disclosed in the embodiment. Further, the constituent elements may be combined appropriately over different embodiments.

It is to be understood that the invention is not limited to the specific embodiment described above and that the present invention can be embodied with the components modified without departing from the spirit and scope of the present invention. The present invention can be embodied in various forms according to appropriate combinations of the components disclosed in the embodiments described above. For example, some components may be deleted from all components shown in the embodiments. Further, the components in different embodiments may be used appropriately in combination.

What is claimed is:

1. A magnetic recording medium comprising:
   a substrate;
   a ferromagnetic recording layer that is formed on the substrate, surrounded by a grooved pattern; and
   a protection layer formed on the ferromagnetic recording layer and to fill in the grooved pattern,
   wherein the ferromagnetic recording layer is included in a servo portion of the magnetic recording medium that retains servo data and in a recording track portion of the magnetic recording medium that retains recording data, and
   wherein a thickness of the protection layer on the ferromagnetic recording layer in the servo portion is larger than a thickness of the protection layer on the ferromagnetic recording layer in the recording track portion by a thickness that is in a range from 1 nm to 10 nm.

2. The medium according to claim 1, wherein the protection layer comprises an alloy of metal materials selected from a group consisting of Ni, Nb, Cu, Hf, Zr, Cr, Ru, Pt, Pd, Ti, Ta, Mo, and W.

3. The medium according to claim 1, wherein the ferromagnetic recording layer comprises magnetic particles dispersed therein.

4. The medium according to claim 1, wherein the protection layer covers a top of the ferromagnetic layer and fills in the grooved pattern.

5. A magnetic storage device comprising:
   a magnetic recording medium in which data is recorded; and
   a magnetic head that floats on the magnetic recording medium and accesses the data,
   wherein the magnetic recording medium includes:
   a substrate;
   a ferromagnetic recording layer that is formed on the substrate, surrounded by a grooved pattern; and
   a protection layer formed on the ferromagnetic recording layer and to fill in the grooved pattern,
   wherein the ferromagnetic recording layer is included in a servo portion of the magnetic recording medium that retains servo data and in a recording track portion of the magnetic recording medium that retains recording data, and
   wherein a thickness of the protection layer on the ferromagnetic layer in the servo portion is larger than a thickness of the protection layer on the ferromagnetic layer in the recording track portion by a thickness that is in a range from 1 nm to 10 nm.

6. The device according to claim 5, wherein the protection layer comprises an alloy of metal materials selected from a group consisting of Ni, Nb, Cu, Hf, Zr, Cr, Ru, Pt, Pd, Ti, Ta, Mo, and W.

7. The device according to claim 5, wherein the magnetic recording medium further includes a soft magnetic layer that is formed under the ferromagnetic recording layer, and
   wherein the soft magnetic layer comprises amorphous soft magnetic material selected from a group consisting of CoZr alloy, CoZrNb alloy, and CoZrTa alloy.

8. The device according to claim 5, wherein the ferromagnetic recording layer comprises magnetic particles dispersed therein.

9. A magnetic recording medium comprising:
   a substrate;
   a ferromagnetic recording layer including recording layer patterns with grooves therebetween; and
   a protection layer formed to cover the recording layer patterns and to fill in the grooves,
   wherein the ferromagnetic recording layer is included in a servo portion of the magnetic recording medium and in a recording track portion of the magnetic recording medium, and
   wherein a thickness of the protection layer on an upper surface of recording layer patterns in the servo portion is greater than a thickness of the protection layer on an upper surface of recording layer patterns in the recording track portion by an amount that is in a range from 1 nm to 10 nm.

10. The medium according to claim 9, wherein a difference in thickness between the protection layer on an upper surface of recording layer patterns in the servo portion and the protection layer on an upper surface of recording layer patterns in the recording track portion is less than 4 nm.

11. A magnetic storage device comprising a magnetic head and a magnetic recording medium according to claim 9.

* * * * *